United States Patent [19]
Widenhoefer et al.

[11] Patent Number: 5,362,390
[45] Date of Patent: Nov. 8, 1994

[54] SHUT-OFF VALVE FOR SPIN-ON FILTERS

[75] Inventors: Ronald H. Widenhoefer; Roger A. Johnson, both of Albert Lea, Minn.

[73] Assignee: Fleetguard, Inc., Nashville, Tenn.

[21] Appl. No.: 83,913

[22] Filed: Jun. 28, 1993

[51] Int. Cl.$^5$ ............................................. B01D 35/153
[52] U.S. Cl. .................................... 210/235; 210/136; 210/431; 210/440; 210/DIG. 17
[58] Field of Search ............... 210/136, 235, 429, 430, 210/440, 444, DIG. 17, 443; 251/149.5, 149.6

[56] References Cited

U.S. PATENT DOCUMENTS

| | | | |
|---|---|---|---|
| 3,388,801 | 6/1968 | Boyd et al. | 210/234 |
| 3,473,664 | 10/1969 | Hultgren | 210/130 |
| 3,589,517 | 6/1971 | Palmai | 210/136 |
| 3,608,726 | 9/1971 | Crowther | 210/234 |
| 4,052,307 | 10/1977 | Humbert, Jr. | 210/130 |
| 5,030,345 | 7/1991 | Thomas | 210/248 |
| 5,049,269 | 9/1991 | Shah | 210/234 |

FOREIGN PATENT DOCUMENTS 1444574  8/1976  United Kingdom ............. 251/149.5

Primary Examiner—Matthew O. Savage
Attorney, Agent, or Firm—Woodard, Emhardt, Naughton, Moriarty & McNett

[57] ABSTRACT

A shut-off valve for a spin-on filter includes a generally cylindrical outer housing which has an open top surface and an annular spring channel formed in that top surface for receipt of a coil spring. The spring is positioned so as to act on a valve actuator and gasket combination which are moveable relative to a valve seat for opening and closing the shut-off valve. In the normally closed condition the spring exerts a spring biasing force on the upper portion of the valve actuator which pushes it against the gasket and pushes the gasket against the outer sealing ridge of the valve seat. In this condition any liquid flowing into the top center opening of the housing will not be allowed to pass through the lowered centered opening of the valve seat. However, when the spin-on filter which includes the shut-off valve is spun onto a mounting base a stem on that mounting base pushes upwardly on the valve actuator compressing the spring and creating a liquid flow path between the gasket and the valve seat. The shut-off valve is completely self-contained within the spin-on filter and as the filter is removed from the mounting base the shut-off valve simultaneously closes so as to trap any liquid left in the filter and prevent any leakage or spillage of that liquid.

2 Claims, 5 Drawing Sheets

SHUT-OFF VALVE FOR SPIN-ON FILTERS

BACKGROUND OF THE INVENTION

The present invention relates generally to spin-on filters for filtering liquids/fluids, such as motor oil. More specifically the present invention relates to a shut-off valve for a spin-on filter, the shut-off valve being configured so as to restrict the flow of liquid from within the filter when the filter is removed from its base or mounting pad.

While it is acknowledged that various spin-on liquid filters include an anti-drain back valve cooperatively arranged with the inlet port, none of the filters known to the present inventors include any type of shut-off valve associated with the outlet port which valve is completed self-contained within the filter assembly.

There are a variety of valve arrangements for liquid filters which are disclosed in various issued United States patents. The following patent references are believed to provide a representative sampling of these various valve arrangements:

| U.S. Pat. No. | Patentee | Issue Date |
| --- | --- | --- |
| 3,388,801 | Boyd et al. | June 18, 1968 |
| 3,589,517 | Palmai | June 29, 1971 |
| 3,608,726 | Crowther | Sept. 28, 1971 |
| 5,030,345 | Thomas | Jul. 9, 1991 |
| 5,049,269 | Shah | Sept. 17, 1991 |

One of the drawbacks with the types of valve designs represented by the listed patents is that portions of the valve extend beyond the outer enclosure wall or end plate of the filter assembly. This type of valve design is not compatible with the requirements for a spin-on filter. Since the shut-off valve of the present invention is fully contained within the filter assembly enclosure, it is compatible with spin-on filters and cooperates with the nature and style of the mounting pad or base to which the spin-on filter assembly is attached. It is a stem portion of the mounting pad which operates to open the valve as the filter assembly is spun onto the mounting pad (threaded engagement). When the filter is spun off of the mounting pad (base) the spring-biased nature of the shut-off valve causes it to close automatically so as to trap any liquid which is retained within the filter. The closed valve prevents any leakage or spillage of the retained liquid until the filter assembly can be disposed of in an environmentally sound and responsible manner.

SUMMARY OF THE INVENTION

A shut-off valve for a spin-on filter according to one embodiment of the present invention comprises a hollow housing having an upper spring channel and a lower peripheral lip, a coiled spring positioned in the upper spring channel, a valve actuator having an upper sealing flange and a lower sealing surface, an annular gasket disposed around the valve actuator and below its upper sealing flange, and a valve seat having an outer peripheral lip which is joined to the lower peripheral lip of the housing so as to encase the spring, valve actuator and gasket, the valve seat including an upper abutment surface for sealing engagement with the gasket and a lower surface defining a flow-through aperture, the gasket being spring-biased against the valve seat by way of the valve actuator and the gasket being moveable away from the valve seat by compression of the spring by way of the valve actuator.

One object of the present invention is to provide an improved shut-off valve for a spin-on filter.

Related objects and advantages of the present invention will be apparent from the following description.

DESCRIPTION OF THE PREFERRED EMBODIMENT

Figure 1:
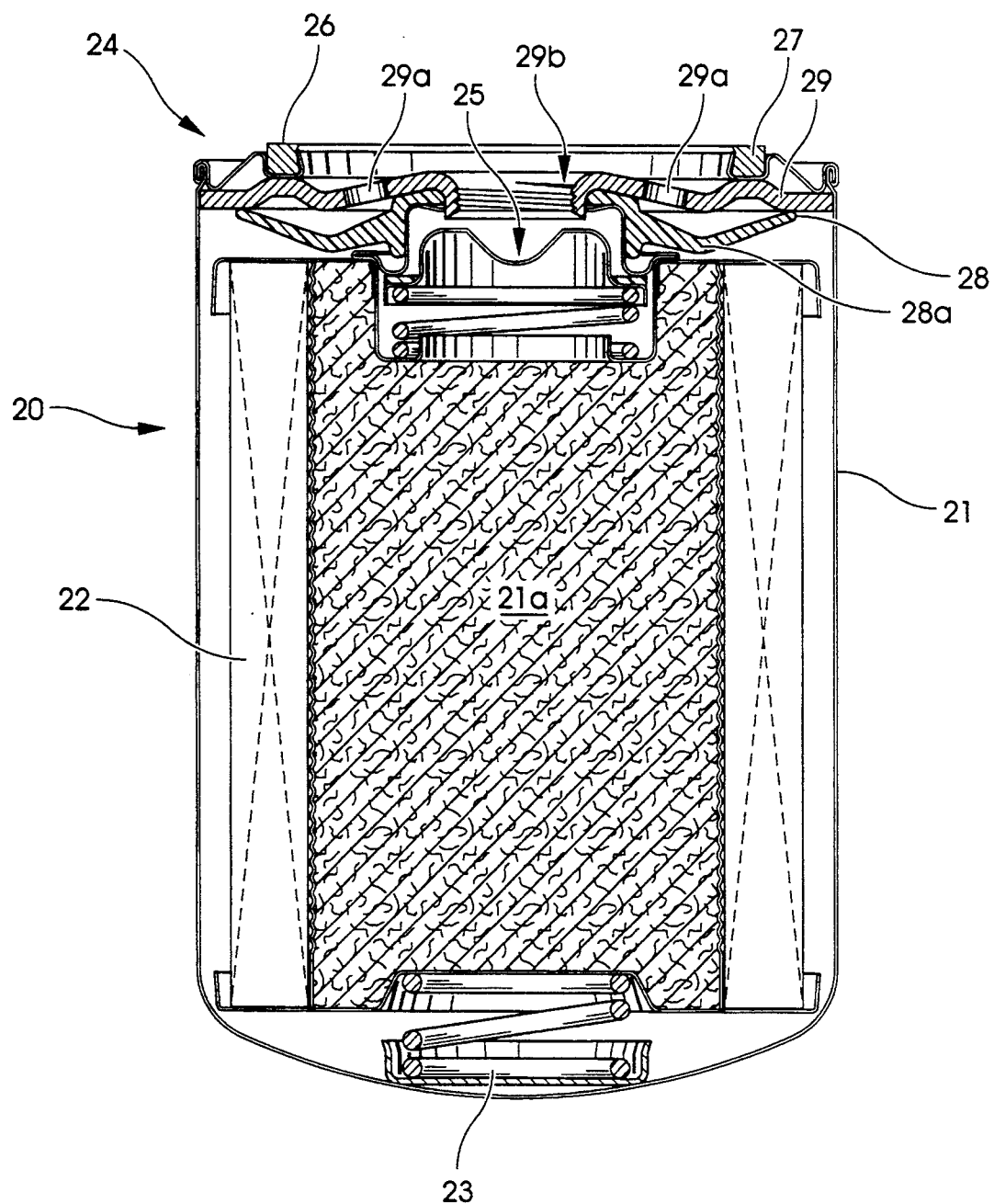
FIG. 1 is a front elevational view in full section of a according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a spin-on filter assembly 20 according to the present invention. Filter assembly 20 includes an outer enclosure 21, filtering element 22, spring 23, end plate assembly 24 and shut-off valve 25. The outer enclosure 21 and end plate assembly 24 are securely assembled to each other and in combination define an inner chamber 21a. Filter assembly 20 is designed and arranged to assemble onto a mounting pad or base by threaded engagement and thus the reference to "spin-on" filter assembly. As is clearly illustrated, shut-off valve 25 is completely self-contained within the outer enclosure of filter assembly 20 and in positional relationship to the outer enclosure the shut-off valve is located on the interior of the enclosure relative to the end plate assembly 24. There is no portion of shut-off valve 25 which extends out from or beyond the remainder of filter assembly 20. In this way the outermost end surface 26 of the filter assembly 20 remains substantially flat and compatible for mounting to a base which has a substantially flat outer periphery. The outermost surface of the end plate assembly 24 and thus of filter assembly 20 is actually face seal 27. This face seal is configured like a retained O-ring made of an elastomeric material. In the FIG. 1 arrangement the shut-off valve is closed and whatever liquid might be inside of the filter assembly enclosure, either retained by the filter element 22 or otherwise, is trapped and does not leak or spill from the filter assembly.

When filter assembly 20 is removed from its spin-on mounting pad (base), there is no incoming flow of fluid, such as oil, so as to deflect and thus lift the sealing flange 28 of annular elastomeric gasket 28a up and away from nutplate 29. The sealing flange 28 is in a normally closed condition so as to prevent any backflow or reverse flow of fluid out through inlet flow apertures 29a in nutplate 29. The only exit path for fluid trapped and retained in filter assembly 20 is via shut-off valve 25 and threaded outlet 29b in nutplate 29. However, shut-off valve 25 is also in a closed condition and there is no open exiting path out of the filter assembly 20 for any trapped and retained fluid.

Figure 2:
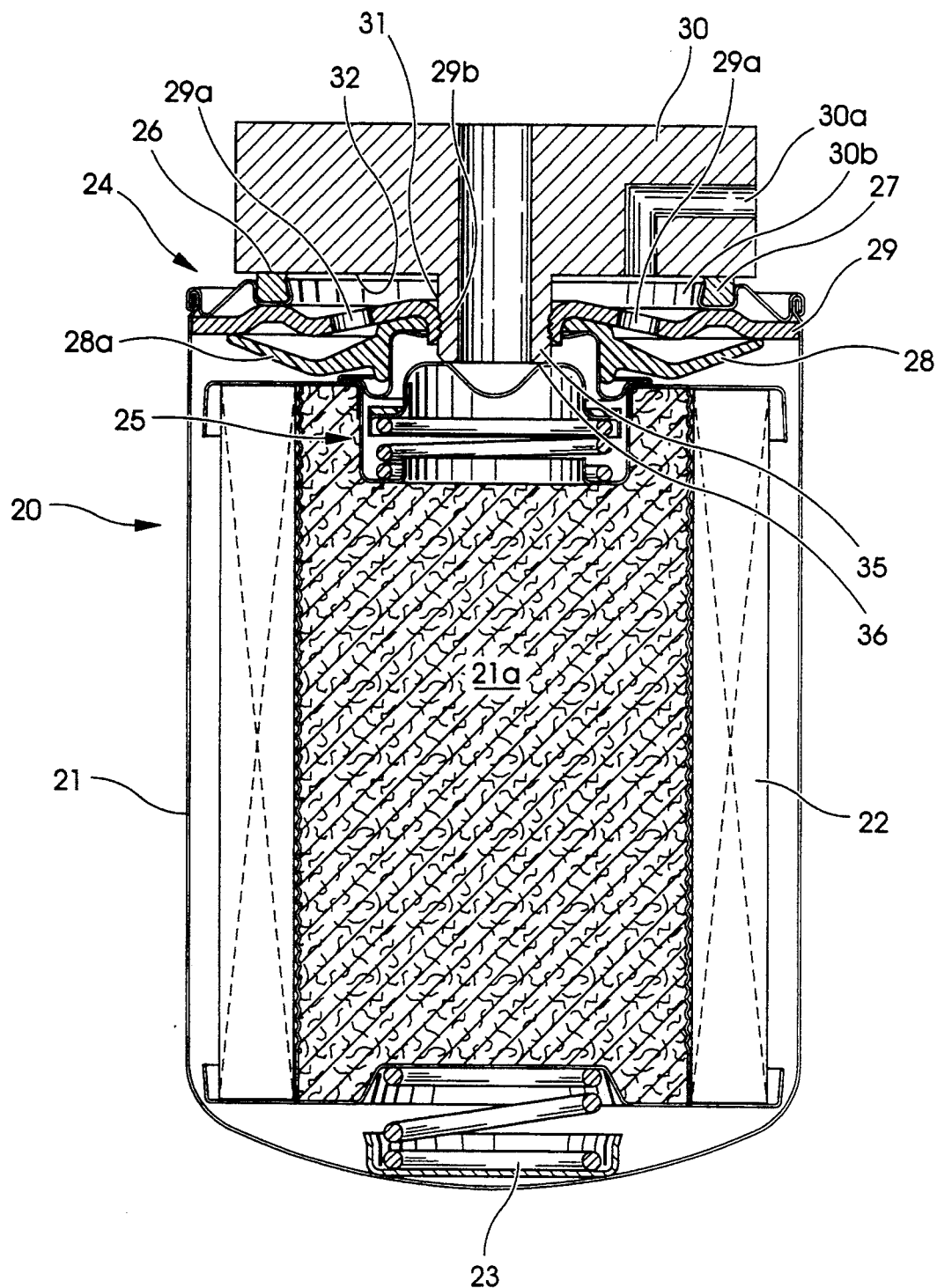
FIG. 2 is a front elevational view in full section of the FIG. 1 filter assembly as mounted on a base with the shut-off valve in an open condition according to the present invention.

Referring now to FIG. 2, the FIG. 1 filter assembly is illustrated as installed onto a base (mounting pad) 30. Base 30 is generally cylindrical in shape (although only a side elevational view is provided) and is intended to represent and simulate the mounting pad onto which a spin-on filter assembly would typically be attached. Base 30 includes and defines a flow inlet passageway 30a which is connected to a supply of the fluid to be filtered through filter assembly 20. Passageway 30a makes a right angled turn and thus directs any fluid flowing therethrough into chamber 30b allowing circumferential flow around stem 31 and flow communication with inlet flow apertures 29a. As illustrated, base 30 has an abutment surface 32 which is substantially flat and concentrically surrounds the generally cylindrical, center stem 31. The abutment surface 32 of base 30 is tightly positioned up against face seal 27 so as to provide a liquid-tight interface. It is this sealed interface which helps to define chamber 30b.

The internally threaded outlet 29b in filter assembly 20 (see FIG. 1) receives the externally threaded end 35 of stem 31. The annularly-shaped free edge 36 of end 35 extends through nutplate 29 and contacts shut-off valve 25. The positioning of edge 36 (end 35) is such that when the base and filter assembly are "spun" into an assembled condition (via mating thread engagement of outlet 29b and stem 31) the edge 36 pushes inwardly against shut-off valve 25. With continued threaded engagement between stem 31 and outlet 29b and with the corresponding continued advancement of stem 31 and edge 36 into the interior filter assembly 20, the shut-off valve 25 is pushed open and this is the condition which is illustrated in FIG. 2.

The inlet to outlet flow path through filter assembly 20 when the filter assembly is spun on to base 30 and shut-off valve 25 is open begins with inlet passageway 30a. From there the flow is around chamber 30b through the inlet flow apertures 29a, passed sealing flange 28 (between flange 28 and nutplate 29) and through the filtering element 22 and into inner chamber 21a. From the inner chamber 21a the fluid flow passes through the shut-off valve 25, around the valve actuator of valve 25 and between the valve actuator and the valve seat of valve 25.

Figure 3:
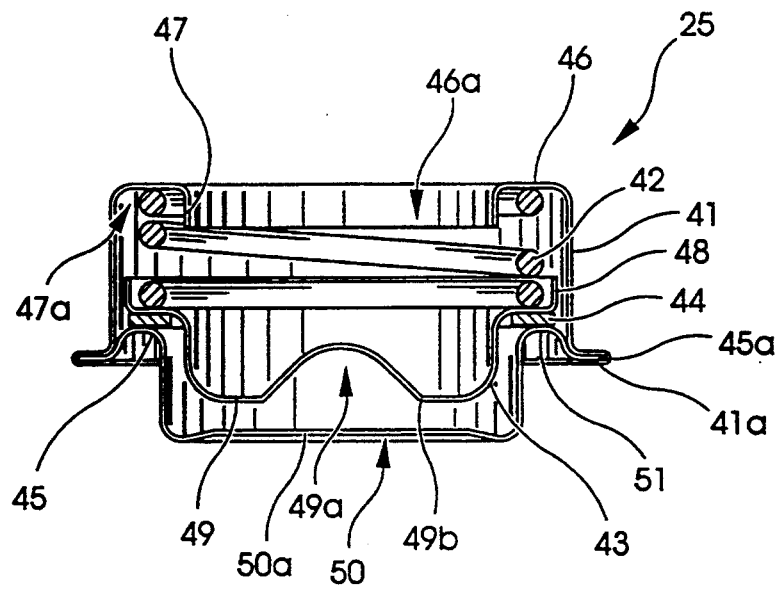
FIG. 3 is a diagrammatic, front elevational view of the FIG. 1 shut-off valve in a closed condition according to the present invention.

Referring to FIG. 3 valve 25 is illustrated in a closed condition. Valve 25 includes a housing 41, spring 42, valve actuator 43, gasket 44 and valve seat 45. Each of these component parts are generally cylindrical in design though the sides, edges and flanges preclude having a true or straight cylinder. Each of the component parts comprising valve 25 are annular in shape and fit together in a stacked configuration, an exploded view of which is provided in FIG. 5.

Housing 41 has a recessed top wall 46 which defines a center open aperture 46a and which further forms inverted boss 47 which in turn creates an outer, annular, inwardly directed receiving channel 47a. Channel 47a receives the upper end of spring 42. Spring 42 is a coil spring having a generally cylindrical shape and an open interior. Spring 42 creates a biasing spring force against valve actuator 43 causing the valve actuator and gasket 44 to be pressed into sealing engagement against valve seat 45. In order to separate the valve actuator 43 and gasket 44 from valve seat 45, it is necessary to push upwardly on the valve actuator 43 so as to compress spring 42 and thereby create a fluid flow passageway. The outer flange 45a of valve seat 45 is joined to the outer, lower lip 41a of housing 41 so as to encase spring 42, valve actuator 43 and gasket 44.

The open interior of spring 42 is large enough for the spring to fit around the inverted boss 47 which defines the top centered aperture 46a. As illustrated, positioned below spring 42 is valve actuator 43 which is a continuous and uninterrupted member having an outer sealing flange 48 and lower tub portion 49. The tub portion includes a centered, elongated recess 49a having an outer edge 49b which serves to provide an abutment edge location for edge 36 of stem 31 to push up against valve actuator 43 in order to open valve 25. The general shape of elongated recess 49a is that of a trough which is open at each end. The open ends of recess 49a provide an exiting flow path for the fluid when the filter is mounted onto base 30 (see FIG. 1). The tub portion 49 is continuous and uninterrupted and thus when the outer flange 48 is tightly sealed against the valve seat via gasket 44 there is no flow path for any liquid within the filter assembly to escape past, around or through the valve actuator 43.

The valve seat 45 has an open, annularly centered portion 50 defining an aperture 50a which is centered over and around the outer surface of internally threaded outlet 29b and indirectly around stem 31. Consequently, as stem 31 is threadedly advanced into filter assembly 20, the top edge 36 of stem 31 advances through aperture 50a up against the annular edge 49b of valve actuator 43 pushing the valve actuator off of valve seat 45.

Figure 4:
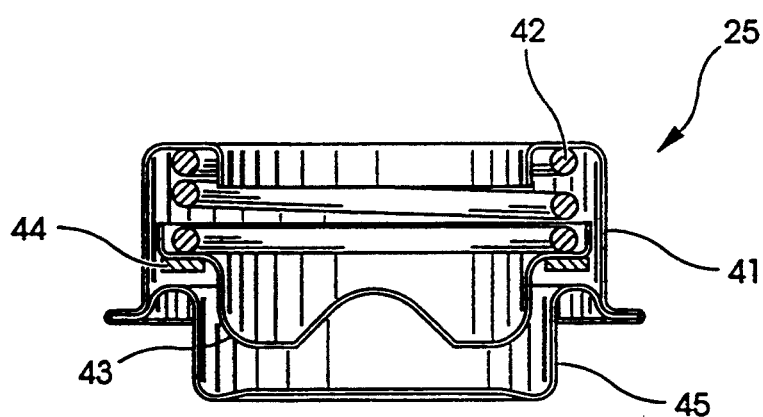
FIG. 4 is a diagrammatic, front elevational view of the FIG. 2 shut-off valve in an open condition according to the present invention.
Figure 5:
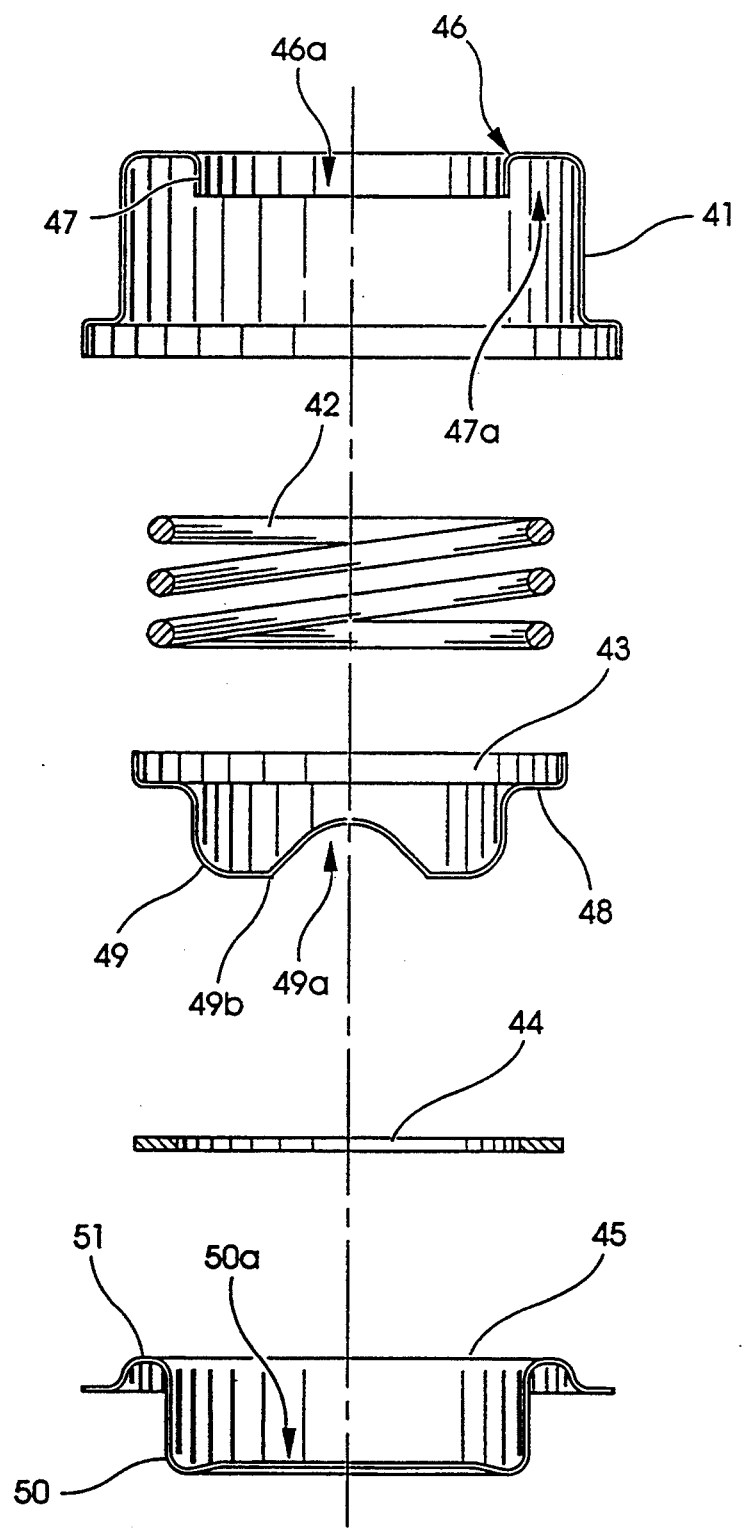
FIG. 5 is a diagrammatic, front elevational, exploded view of the component parts comprising the shut-off valve of FIGS. 3 and 4.
Figure 6:
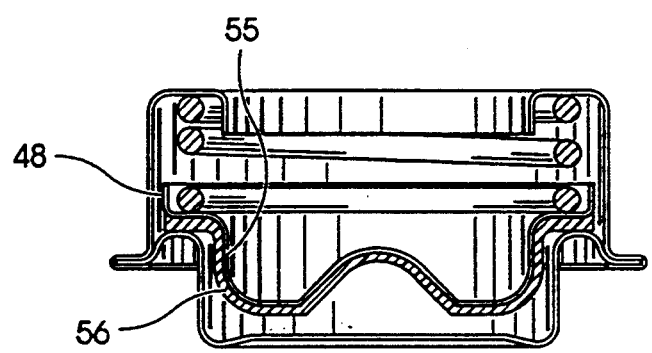
FIG. 6 is a diagrammatic, front elevational view of an alternative shut-off valve according to the present invention.

As illustrated in FIGS. 3, 4, and 5, annular gasket 44 is disposed between flange 48 and upper ridge 51 of valve seat 45. In one embodiment gasket 44 is annular in shape and is bonded to the underside of flange 48 so as to travel with the valve actuator as if a single, integral unit. An alternative approach suitable for gasket 44 is illustrated in FIG. 6 where actuator 55 is coated on its lower surface with a layer 56 of an elastomeric material.

In FIG. 4, the shut-off valve 25 is disposed in an open condition, only diagrammatically illustrated because there is no illustrated stem pushing up on the valve actuator in order to compress spring 42 and lift the valve actuator off of the valve seat 45. As illustrated, spring 42 is compressed and a flow path for liquid is created down through the top of housing 41, around the outer edges of flange 48 and thorough the clearance between valve actuator 43 and ridge 51. The actual flow path is between ridge 51 and gasket 44, as is illustrated.

The spring biasing force on valve actuator 43 by way of spring 42 ensures that as the filter assembly 20 is removed from base 30 (spun off), the valve actuator 43 (and gasket 44) will automatically and in effect simultaneously close, thereby trapping any liquid which is within the filter assembly and preventing any leakage or spilling of that liquid. The filter assembly can thus be handled and transferred as part of being discarded without any concerns as to leakage or spillage. This allows the filter assembly to be easily handled and disposed of in an environmentally sound and responsible manner. With the present invention concerns about leakage and spilling are eliminated and it is easier to handle and discard the old filter assembly.

Referring to FIG. 5 the component parts of shut-off valve 25 are illustrated as an exploded view so as to clearly show the details and geometry of each part and the nature of their stack-fit assembly.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A spin-on filter designed and arranged for threaded engagement onto a mounting pad, said spin-on filter comprising:

a filter enclosure;

a filtering element disposed within said filter enclosure;

an end plate assembly defining a flow inlet and a flow outlet and being cooperatively arranged with said filter enclosure to define an interior chamber and to direct flow through said interior chamber from said flow inlet through said filtering element to said flow outlet; and a shut-off valve disposed within said interior chamber and being positioned over said flow outlet, said shut-off valve including:

a hollow housing having a spring channel at a first end and an outwardly extending radial flange at a second end;

a spring positioned in said spring channel;

a valve actuator having a sealing flange and being acted upon by said spring, said valve actuator being free of any interior flow aperture;

an annular gasket disposed around said valve actuator adjacent said sealing flange; and a valve seat having an outwardly-extending radial flange which is joined to the radial flange of said housing so as to encase said spring, valve actuator and gasket, said gasket being positioned between said sealing flange and said valve seat and said valve seat including an abutment surface for sealing engagement with said gasket and a base surface defining a flow-through aperture, such that when in said sealing engagement any fluid flow into said valve is blocked by said valve actuator and said gasket, said gasket being spring-biased against said valve seat via said valve actuator and said gasket being moveable away from said valve seat by compression of said spring via said actuator to permit fluid flow through said valve.

2. The spin-on filter of claim 1 wherein said shut-off valve is disposed completely within said interior chamber.

* * * * *

UNITED STATES PATENT AND TRADEMARK OFFICE
CERTIFICATE OF CORRECTION

PATENT NO. : 5,362,390

DATED : November 8, 1994

INVENTOR(S) : Ronald H. Widenhoefer, et al.

It is certified that error appears in the above-indentified patent and that said Letters Patent is hereby corrected as shown below:

On the title page, item [75], add as a third named inventor the following:

James R. Wilkins, Cookeville, Tenn.

Signed and Sealed this

Twenty-sixth Day of September, 1995

Attest:

BRUCE LEHMAN

*Attesting Officer*  *Commissioner of Patents and Trademarks*